(12) United States Patent
Sullivan et al.

(10) Patent No.: US 7,563,131 B2
(45) Date of Patent: Jul. 21, 2009

(54) INTEGRATED WALL PLATE ASSEMBLY AND PREMISE WIRING SYSTEM INCORPORATING THE SAME

(75) Inventors: Thomas Sullivan, Brookville, OH (US); Gary Hess, Springfield, OH (US)

(73) Assignee: Lastar, Inc., Dayton, OH (US)

( * ) Notice: Subject to any disclaimer, the term of this patent is extended or adjusted under 35 U.S.C. 154(b) by 210 days.

(21) Appl. No.: 11/482,191

(22) Filed: Jul. 6, 2006

(65) Prior Publication Data
US 2007/0037442 A1 Feb. 15, 2007

Related U.S. Application Data

(60) Provisional application No. 60/708,036, filed on Aug. 12, 2005.

(51) Int. Cl.
*H01R 13/60* (2006.01)
(52) U.S. Cl. .................. 439/535; 174/59; 439/536
(58) Field of Classification Search ......... 439/535–536; 174/59
See application file for complete search history.

(56) References Cited

U.S. PATENT DOCUMENTS

| | | | |
|---|---|---|---|
| 4,259,616 A | 3/1981 | Smith | |
| 4,273,957 A * | 6/1981 | Kolling, Jr. | ................. 439/535 |
| 4,448,474 A | 5/1984 | Melnychenko | |
| RE31,848 E | 3/1985 | Nilssen | |
| 5,961,345 A | 10/1999 | Finn et al. | |
| 6,056,593 A * | 5/2000 | Strang et al. | ................. 439/536 |
| 6,086,414 A | 7/2000 | Tipton et al. | |
| 6,109,959 A * | 8/2000 | Burlinson et al. | ........... 439/536 |
| 6,123,577 A | 9/2000 | Contois et al. | |
| 6,186,826 B1 * | 2/2001 | Weikle | ....................... 439/536 |
| 6,204,449 B1 * | 3/2001 | Putorti et al. | .................. 174/53 |
| 6,285,912 B1 | 9/2001 | Ellison et al. | |
| 6,394,844 B1 * | 5/2002 | Frias Valero et al. | ........ 439/608 |
| 7,054,442 B2 * | 5/2006 | Weikle | ....................... 379/438 |
| 2002/0142650 A1 | 10/2002 | Clark et al. | |
| 2004/0007379 A1 | 1/2004 | Suzuki et al. | |
| 2005/0101183 A1 * | 5/2005 | McCoy et al. | ................ 439/536 |

FOREIGN PATENT DOCUMENTS

| | | |
|---|---|---|
| DE | 297 14 277 U1 | 12/1997 |
| EP | 0 091 080 A2 | 10/1983 |
| WO | WO 2004/038879 A1 | 5/2004 |
| WO | WO 2004/105194 A2 | 12/2004 |

* cited by examiner

*Primary Examiner*—Tho Dac Ta
*Assistant Examiner*—Larisa Tsukerman
(74) *Attorney, Agent, or Firm*—Dinsmore & Shohl LLP

(57) ABSTRACT

A wall plate for premise wiring. The wall plate is preterminated with a quick-connect coupling to enable fast connection and disconnection with a complementary quick-connect coupling on a wire configured to carry an electrical signal, such as digital or analog audio, visual or related signal. The wall plate may include numerous signal interfaces for audio, visual or combination audio/visual application. By including all of the components into a modular package, installation and removal of the wall plate for premise wiring upgrades is enhanced.

21 Claims, 11 Drawing Sheets

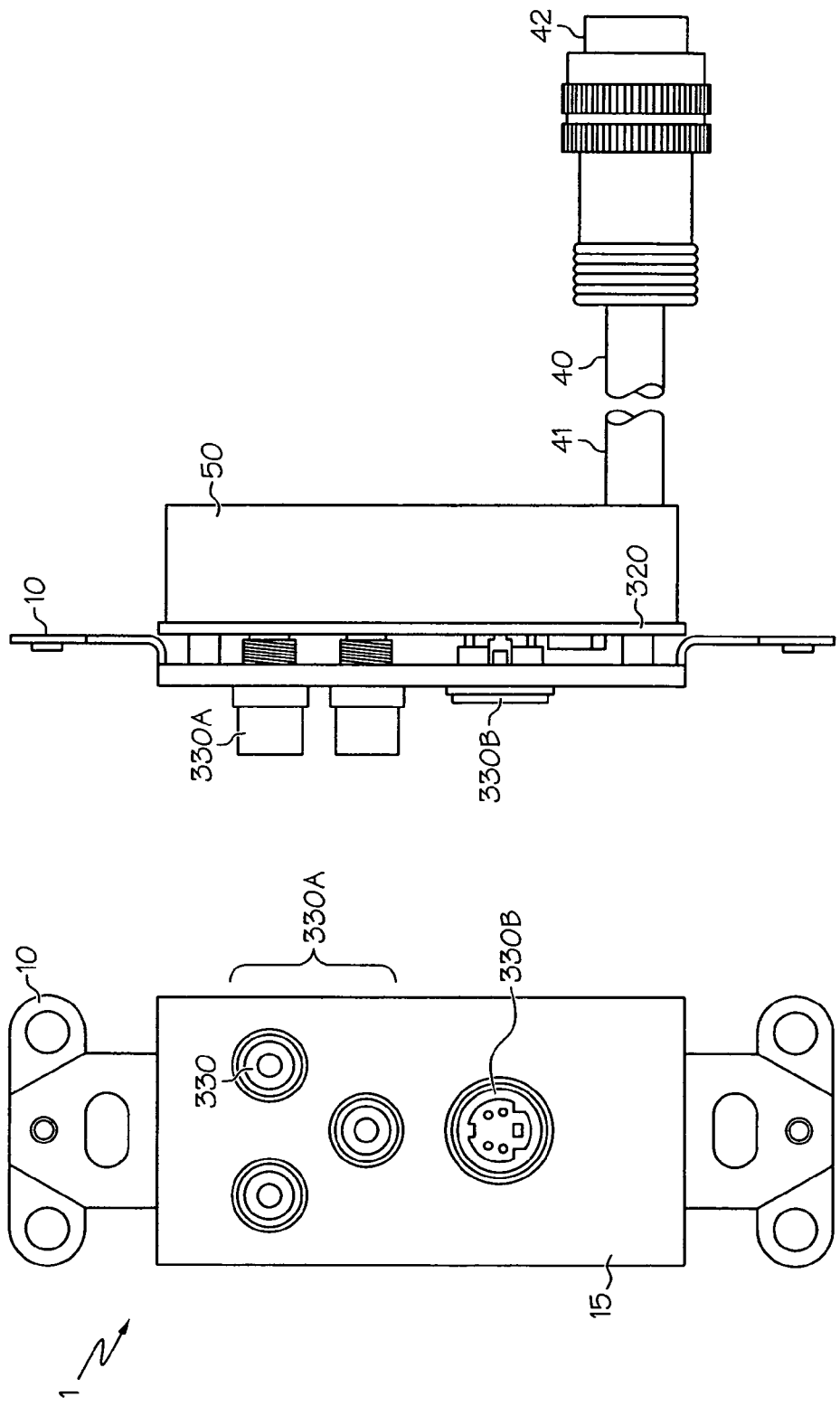

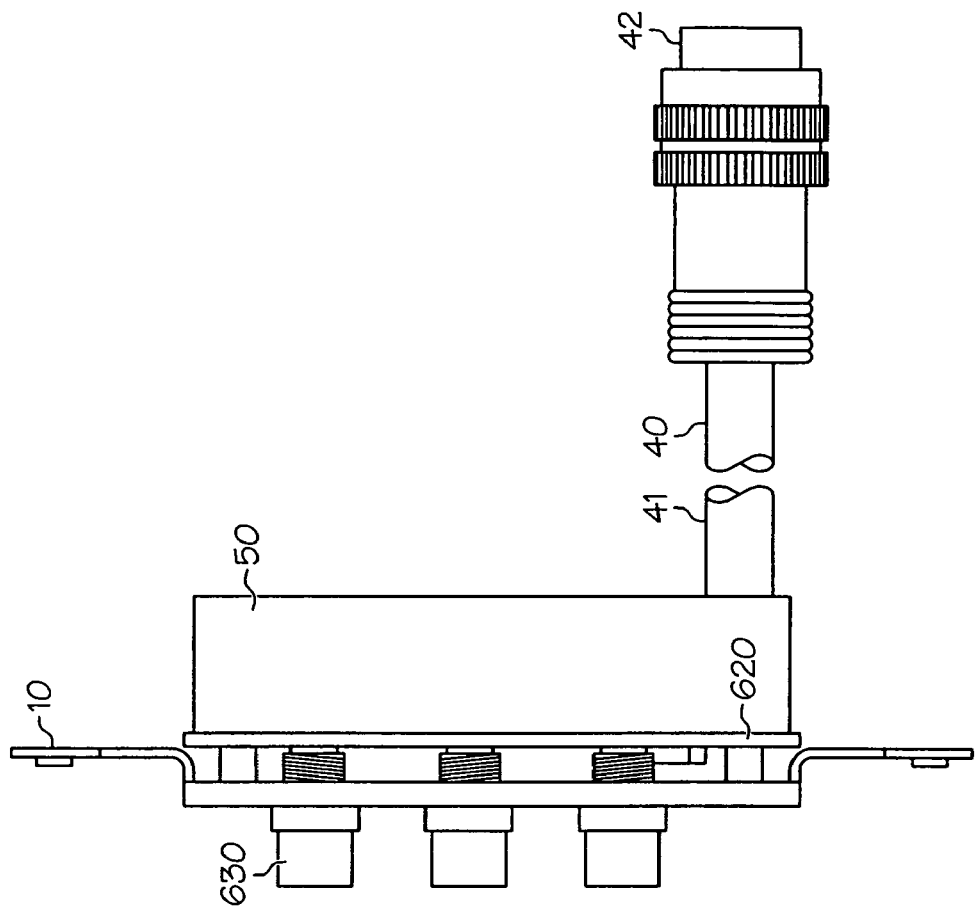
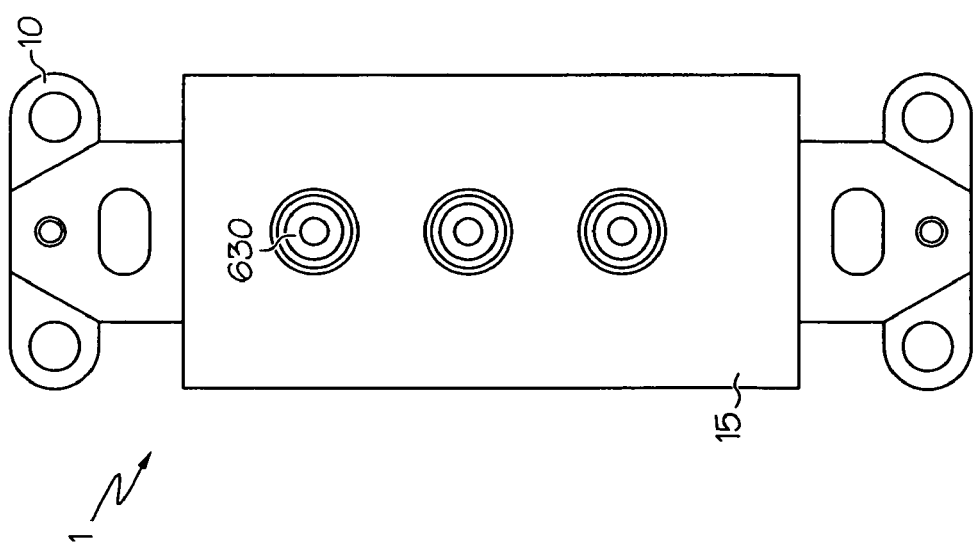

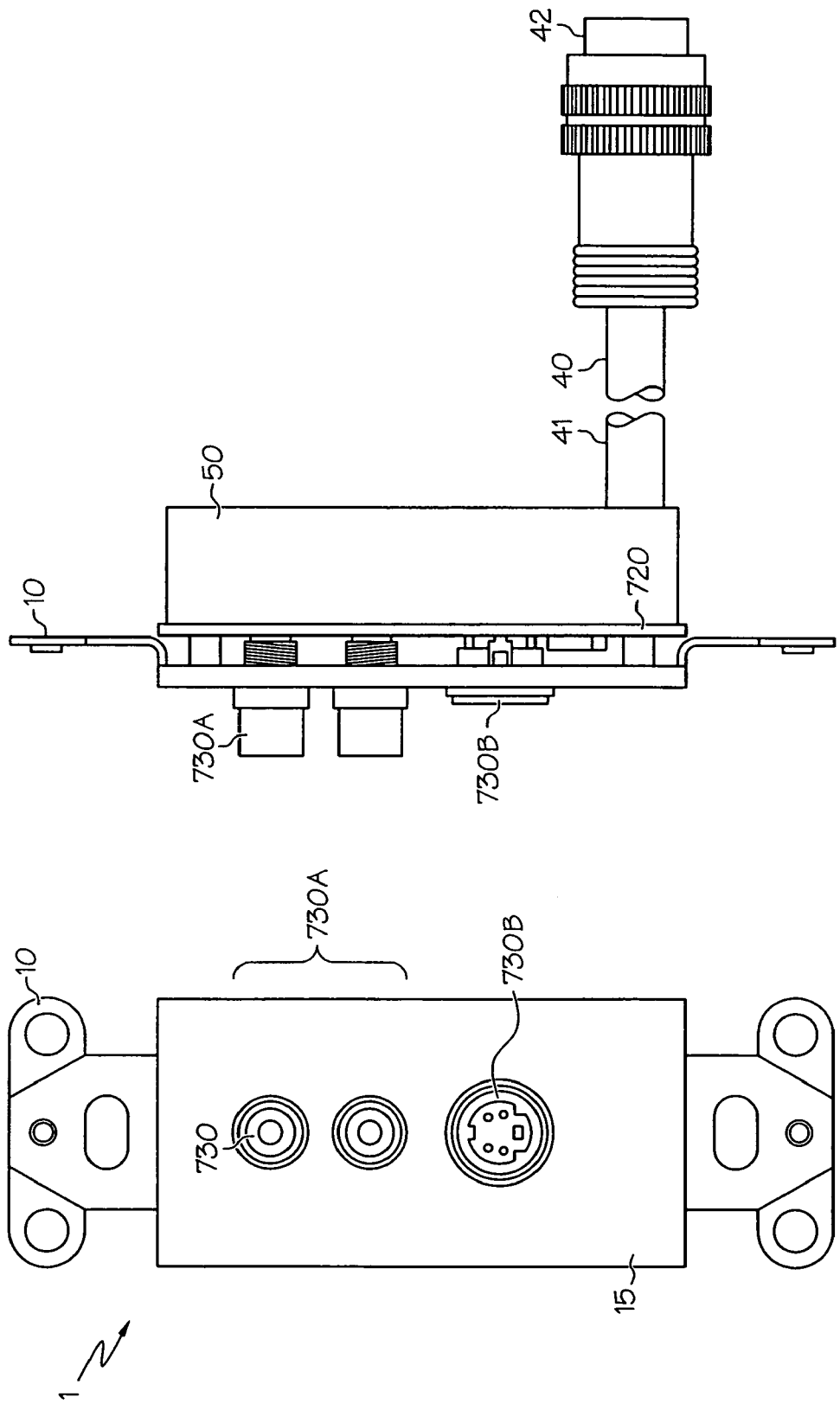

INTEGRATED WALL PLATE ASSEMBLY AND PREMISE WIRING SYSTEM INCORPORATING THE SAME

This application claims the benefit of the filing date of U.S. Provisional Application No. 60/708,036, filed Aug. 12, 2005.

BACKGROUND OF THE INVENTION

The present invention relates generally to wall plates used to convey electric signals through premise wiring systems, and more particularly to a variety of wall plate assemblies with preterminated connections to a premise wiring system.

Wall plates are commonly used to terminate premise wiring. In one general form, the wiring acts as a signal carrier for electrical signals, while in a specific form is capable of conveying audio, video and related data signals between a signal source (such as a computer, audio, video or combination device) and the wall plate. Audio, video and data devices (such as displays, monitors, digital video disk (DVD) players, compact disk (CD) players, video tape recorders or the like) can be plugged into the outlet of the wall plate to complete the signal path. Typically, the terminus of the wiring is such that electrically conductive wires (or a group of wires) are connected to corresponding jacks or related connectors on the wall plate through conventional fastening means, such as by soldered joints, spring-biased clips or screwed posts. The use of such labor-intensive approaches during installation and upgrade is deleterious to an efficient, low cost and reliable finished product. This problem is especially prevalent in wiring systems that require periodic upgrading as new technology becomes available. It is therefore desirable that a more efficient approach to connecting premise wiring to a wall plate be developed.

BRIEF SUMMARY OF THE INVENTION

These desires are met by the present invention, where a wall plate assembly and a method of connecting premise wiring systems is disclosed. According to a first aspect of the invention, a wall plate includes a mounting bracket defining a face on or through which one or more signal interfaces extend outward from. The inclusion of a face on the mounting bracket may be from an integral formation of a surface within the mounting bracket, or from the attachment of a separate generally planar surface to the bracket. Either variant is within the scope of the claimed invention. A circuit board is situated behind the mounting bracket. The signal interface is electrically connected to the circuit board, and acts as an outlet or jack for an electric signal that may be delivered to the wall plate through a wiring system. In addition, the wall plate includes a cable lead that has a proximal end and a distal end. In the present context, the term "cable lead" defines a cable, wire or related electric signal-carrying member that represents either the wall plate termination to the runner cable or the flying lead termination to a runner cable. The proximal end of the cable lead is in electrical communication with the signal interface through the circuit board, while the distal end includes a quick-connect coupling to electrically connect to the premise wiring or signal source. The quick-connect coupling enables fast connection and disconnection with a complementary quick-connect coupling on a signal-carrying wire or cable. The construction of the wall plate is such that most of the components are generally similar, while the signal interfaces can be one or more of various devices discussed in more detail below. Such construction of the components into a modular package promotes wall plate autonomy. Moreover, such modularity makes it easier to accommodate premise wiring upgrades and related system changes.

To be included within the meaning of the term "adjacent", precise side-by-side spacing between the components is not necessary. More particularly, the term is utilized herein to distinguish the quick connect assembly of the cable lead of the present invention from contemplated wiring systems where a length of cable coupled to a wall plate runs from the wall plate to a connector in a location displaced far enough from the wall plate to make it inaccessible to the installer, absent relocation of the installer's base of operation to another room within the structure or another part of a room within the structure. Thus, the distal end of the quick connect assembly would not be "adjacent" the mounting bracket if it were located within a wall section of another room within the structure. Similarly, a configuration where the quick connect assembly was, for example, displaced from the wall plate by ten feet or more would also not be considered adjacent, even if the quick connect assembly and wall plate were in the same room or within the same wall. Preferably, the length of the cable lead can range from less than a few inches to several feet, although particular embodiments of the present invention contemplate cable lead lengths of less than one inch (2.5 cm) to about six inches (15 cm) or, depending upon the preferences of the installer, up to eighteen inches (45 cm).

Optionally, the connection of the cable lead to the wall plate is permanent. In the present context, the term "permanent" applies to arrangements where the connection between two or more joined components is such that any attempt at separating them would result in damage to either or all of them, or that the mechanical or electrical properties for which their connection was effected are severely curtailed. In another option, the cable lead may be configured with either a male or female distal end. In still another option, a housing can be coupled to the wall plate. The housing may form a simple box, made from an inexpensive, lightweight material (such as plastic), or may be made from a metal-based material so that the housing acts as an electromagnetic shield that can substantially enclose the circuit board. As stated above, there may be numerous signal interfaces that extend from the face of the mounting bracket. Examples of the signal interfaces that can be used together or in combination include high-density "D" style subminiature signal interface (HD-15, also called D-subminiature), BNC, 3.5 millimeter, RCA and 4-pin mini-din (S-video). A strain relief member may be placed between the proximal end of the cable lead and the circuit board to improve resistance to damage to the electrical connection between the cable lead and the circuit board. In one form, the cable lead extends rearward from the back of the wall plate. In yet another option, the circuit board may be arranged such that it substantially aligns with the face of the bracket. In the present context, the term "substantially" refers to an arrangement of elements or features that, while in theory would be expected to exhibit exact correspondence or behavior, may, in practice embody something less than exact. As such, the term denotes the degree by which a quantitative value, measurement or other related representation may vary from a stated reference without resulting in a change in the basic function of the subject matter at issue.

According to another aspect of the invention, a premise wiring system is disclosed. The system includes an assembly of wall plate components (such as those discussed in the previous aspect), and further includes at least one wire, cable or similar electrically-conductive signal carrier. As with the cable lead that was discussed above, the wire includes a quick-connect coupling that forms a complementary mate to the quick-connect coupling of the cable lead. Optionally, an enclosure (such as a back shell) may be used. In another option, the portions of the premise wiring system that relate to the wall plate can be placed in a gang box or related enclosure. The one or more signal interfaces may be formed from a combination of the interfaces previously discussed.

According to another aspect of the invention, a method of connecting premise wiring to a wall plate is disclosed. The method includes arranging the premise wiring to include a quick-connect coupling that can be connected to a complementary quick-connect coupling situated on a wall plate assembly. The wall plate assembly includes (in addition to the complementary coupling, such as in the form of a cable lead) a mounting bracket with a circuit board connected to it, one or more signal interfaces that are signally coupled to the wiring system through the couplings and circuit board. Optionally, the complementary quick-connect coupling of the cable lead is permanently attached to the circuit board. A tension-reducing device may be placed between the cable lead and the circuit board to promote strain relief between the assembly and the wire of the wiring system.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which:

FIGS. 6A and 6B illustrate a front and side view of an alternative embodiment wall plate;

FIGS. 9A and 9B illustrate a front and side view of an alternative embodiment wall plate;

FIGS. 10A and 10B illustrate a front and side view of an alternative embodiment wall plate.

DETAILED DESCRIPTION OF THE PREFERRED EMBODIMENTS

Figure 1:
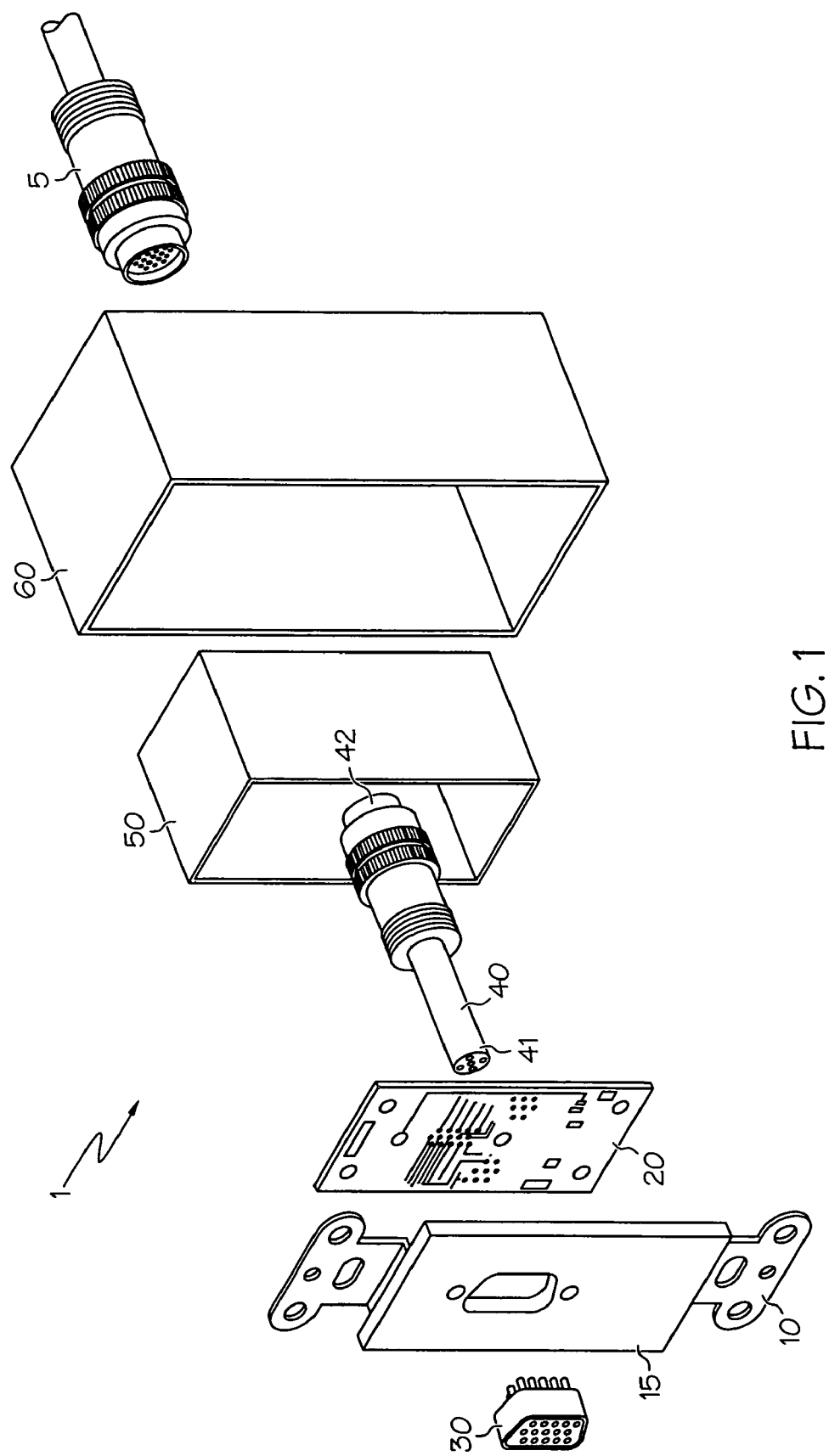
FIG. 1 illustrates an exploded view of a wall plate assembly according to one embodiment of the present invention.

Referring first to FIG. 1, the assembly of a wall plate 1 includes a mounting bracket 10, printed circuit board 20 mounted to the mounting bracket 10, one or more signal interfaces (also called outlets or jacks) 30 that extend from a front face 15 of the mounting bracket 10, and a quick-connect cable lead 40. Cable lead 40 includes a proximal end 41 and a distal end 42. Proximal end 41 is in electrical communication with signal interface 30 through circuit board 20, while distal end 42 electrically connects to a premise wiring system (in the form of a runner cable) 5. The quick-connect nature of the distal end 42 of the cable lead 40 provides a secure and fast coupling with a mating quick-connect electrical connector of a runner cable completing a number of different functioning audio, video or display cables. In this manner, wall plate assemblies according to the present invention can be connected via runner cable to a second wall plate or a flying lead to enable relatively rapid and simple installation of a premise wiring solution. Back shell 50 will be described in more detail below in conjunction with the description of FIG. 3. The wall plate 1 can be assembled into a plastic case (for example, a gang box, also referred to as a junction box) 60 that also houses the terminus point of the wiring system 5. One valuable attribute of the wall plate 1 of the present invention is its modularity made possible by its self-contained construction. For example, when an upgrade to components of an electronic system (such as an audio/visual system, computer system or multimedia system) is required, such as for monitors, displays, source components like DVD or video tape recorders or the like, the wall plate 1 can be easily decoupled from the wiring system 5 (through the quick-connect couplers) and removed, to be replaced by another unit with the appropriate connector(s) on it. The preterminated nature of the connection between the cable lead 40 and the circuit board 20 to allow quick electrical coupling and decoupling from the premise wiring 5 highlights the modular features of the wall plate 1.

Figure 2B:
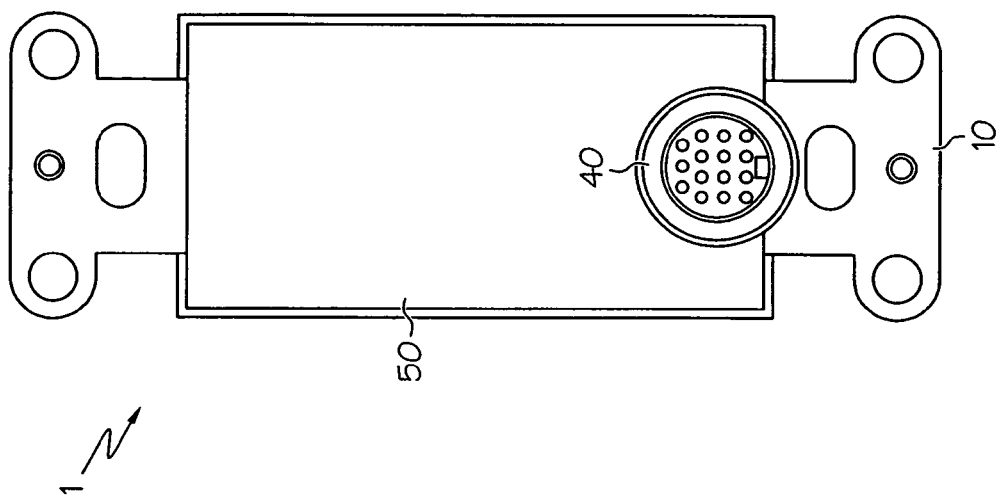
FIGS. 2A through 2C illustrate respectively front, back and side views of the wall plate portion of the assembly of FIG. 1.
Figure 2A:
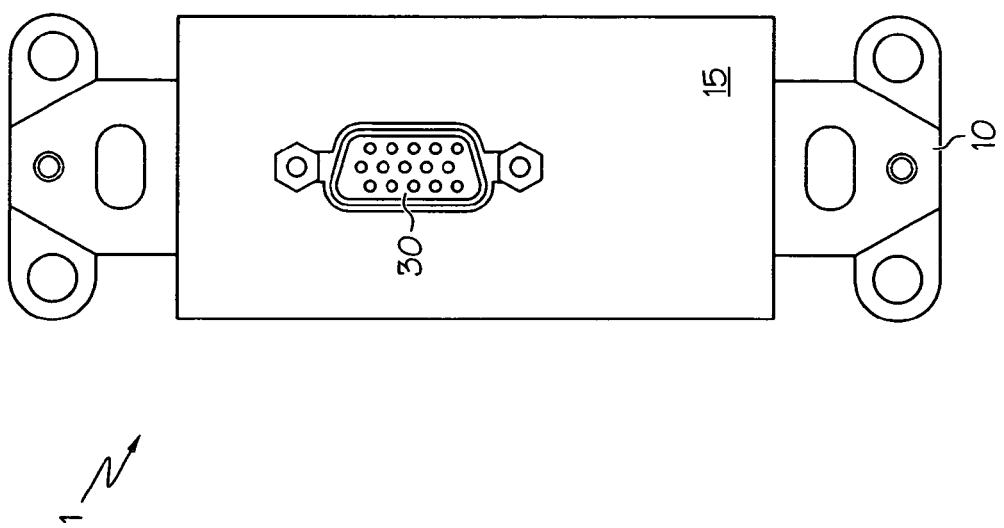
Figure 2C:
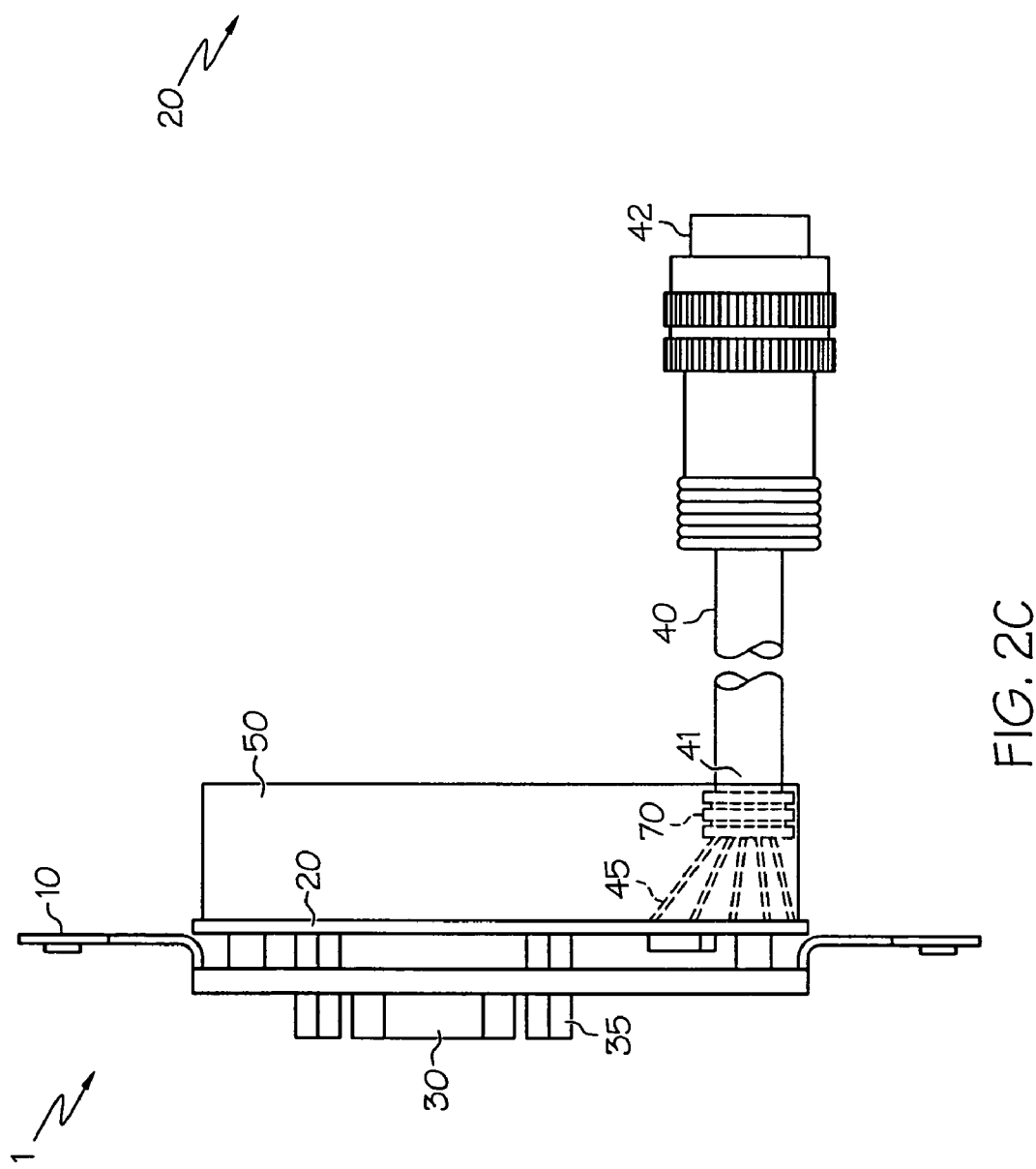

Referring next to FIGS. 2A through 2C, 4A and 4B through 10A and 10B, the signal interface 30 may include various termination configurations. It will be appreciated by those skilled in the art that other connections and interfaces (not shown) may be used, and are understood to be within the scope of the present invention. As such, the present inventors envision that other signal interfaces besides signal interfaces 30 can be included. Referring with particularity to FIGS. 2A through 2C (in conjunction with FIG. 1), an ultra extended graphics array (UXGA) signal interface 30 for video applications is shown with an HD15 outlet. As shown with particularity in FIG. 2C, individual conductive lines 45 that make up the cable of cable lead 40 can be routed to leads on circuit board 20. Also as shown with particularity in FIG. 2C, placement of printed circuit board 20 is such that it generally aligns with the front face 15 of mounting bracket 10. Printed circuit board 20 also includes mounting apertures 27 that can have screws or related fasteners (none of which are shown) to secure the printed circuit board 20 to the mounting bracket 10. In addition, the proximal end 41 of cable lead 40 may include a strain relief 70 to reduce the likelihood of the termination to the printed circuit board 20 becoming undone by a force (such as a tugging force) being placed on wiring system 5.

Figure 4B:
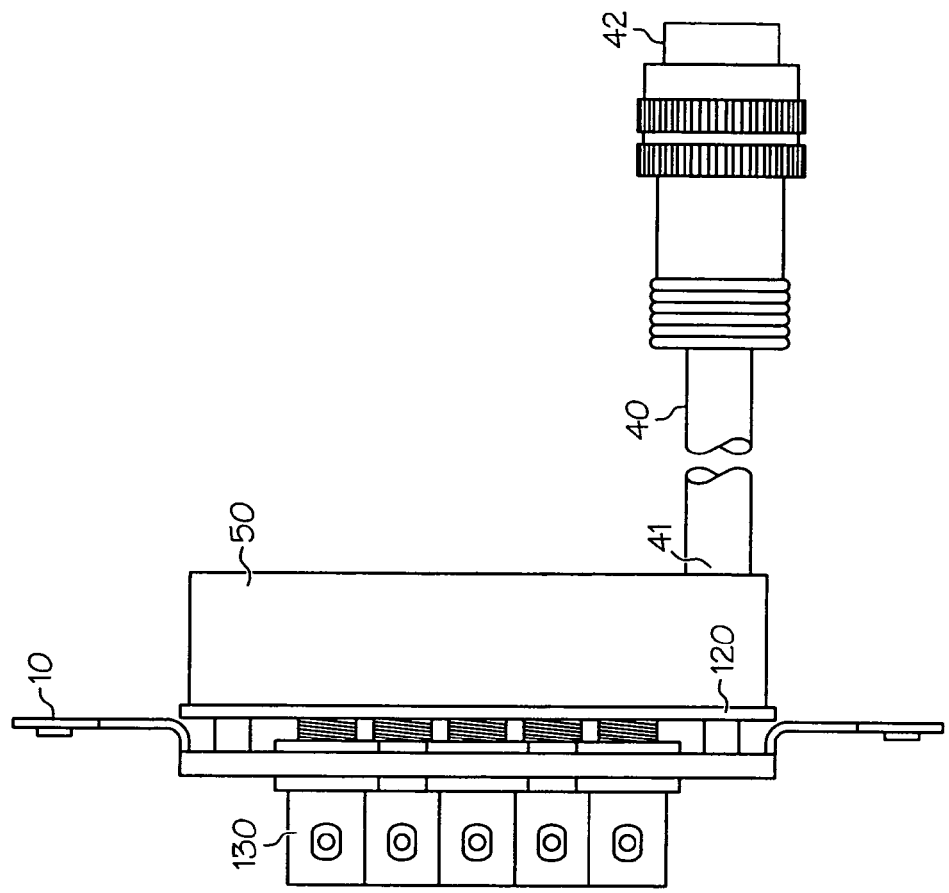
FIGS. 4A and 4B illustrate a front and side view of an alternative embodiment wall plate.
Figure 4A:
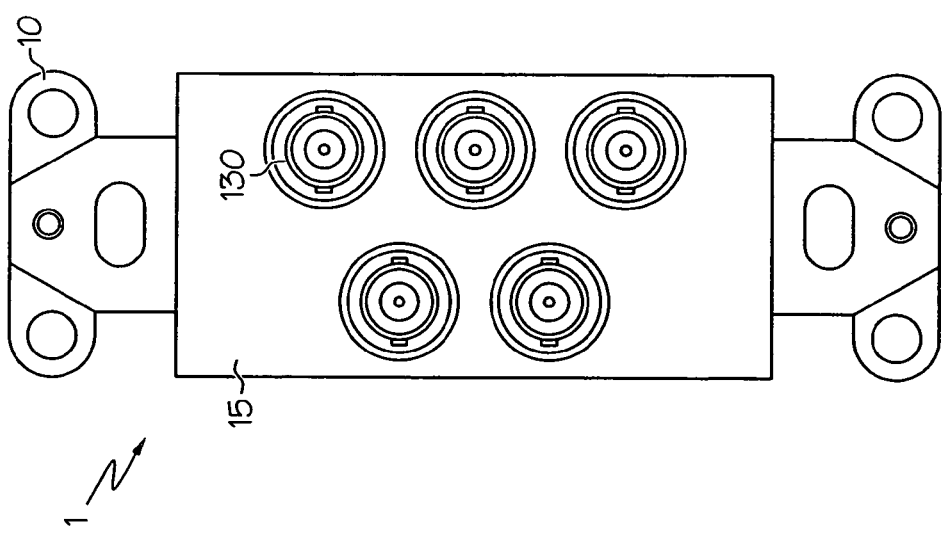
Figure 5B:
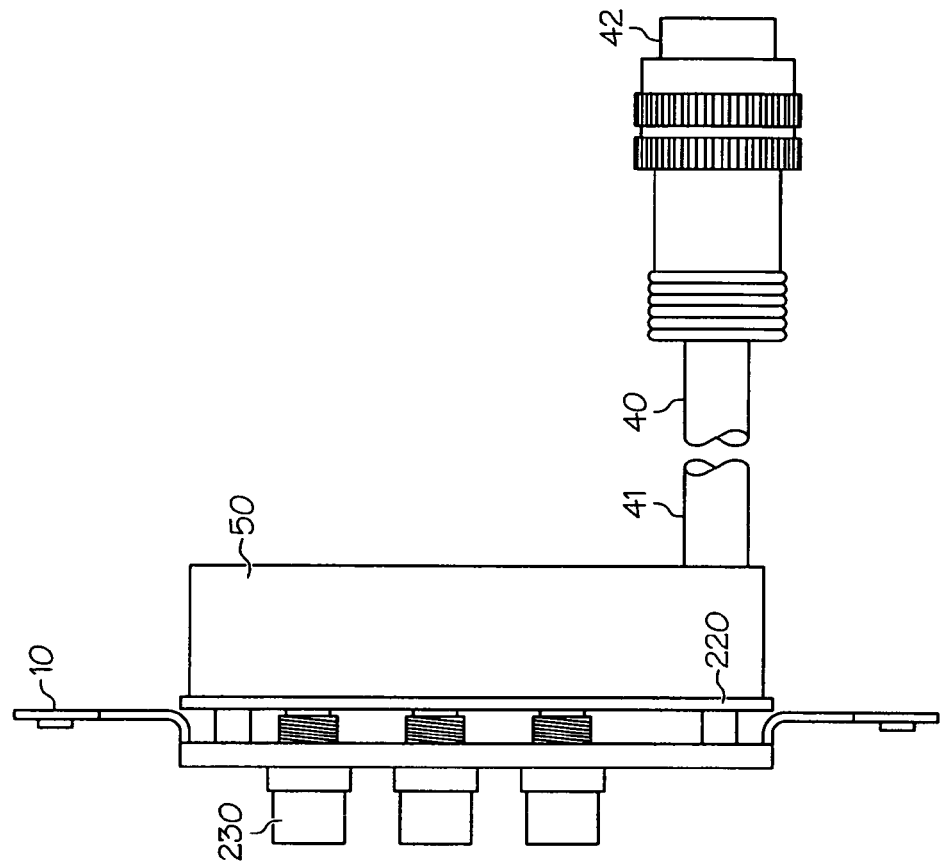
FIGS. 5A and 5B illustrate a front and side view of an alternative embodiment wall plate.
Figure 5A:
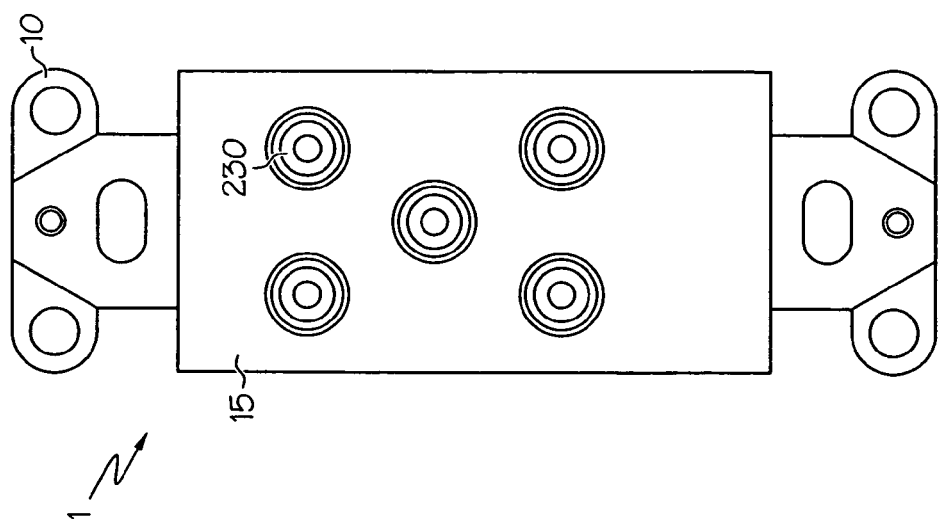
Figure 7B:
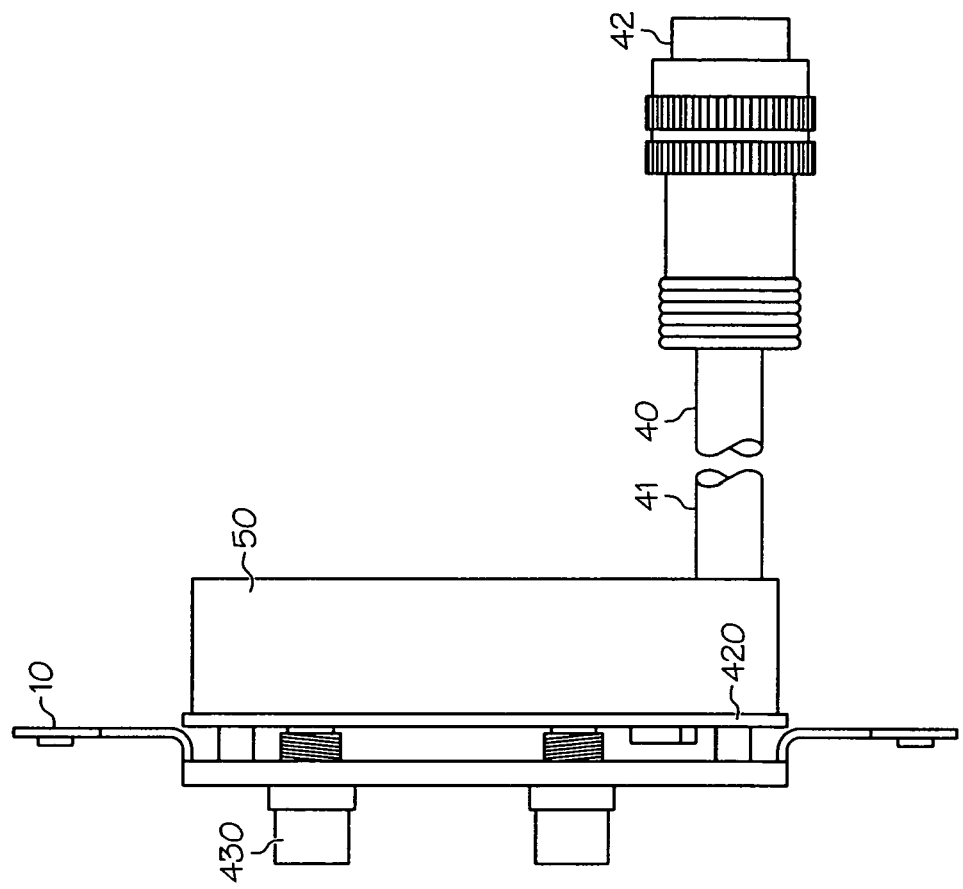
FIGS. 7A and 7B illustrate a front and side view of an alternative embodiment wall plate.
Figure 7A:
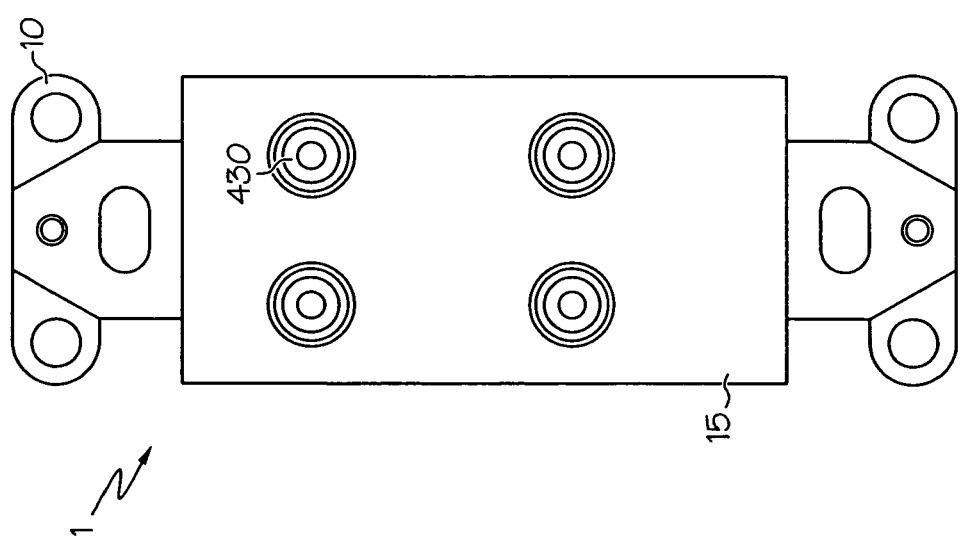
Figure 8B:
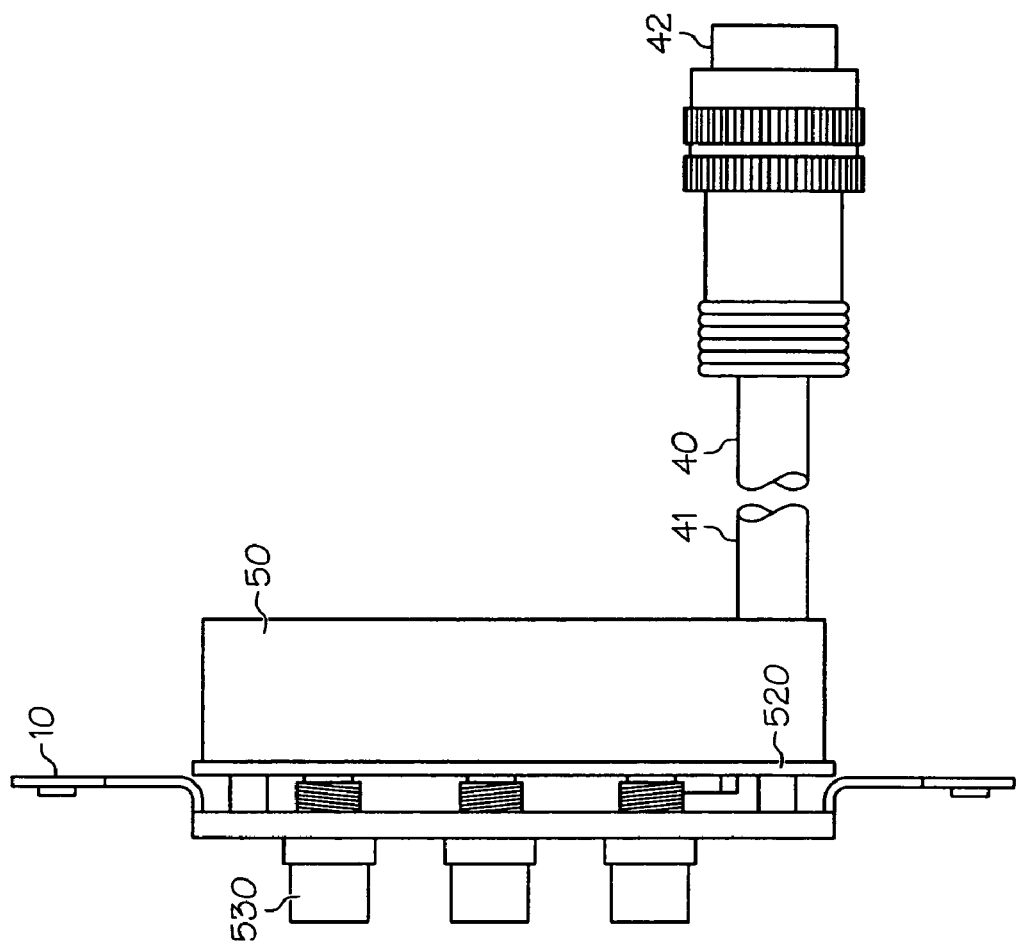
FIGS. 8A and 8B illustrate a front and side view of an alternative embodiment wall plate.
Figure 8A:
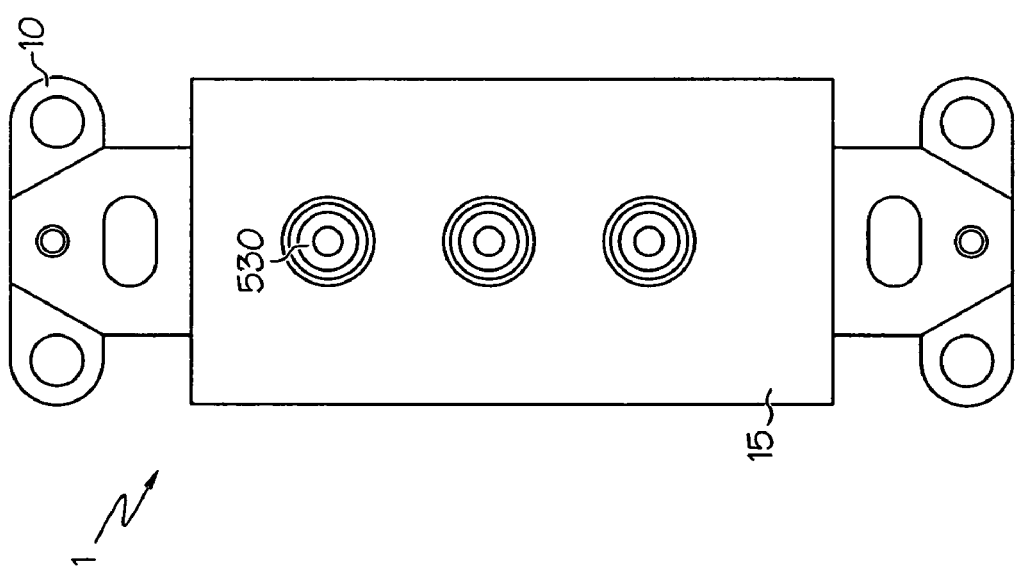

Referring with particularity to FIGS. 4A and 4B, a five-outlet BNC signal interface 130, commonly used in analog and digital video applications, is shown. Referring with particularity to FIGS. 5A and 5B, a five-outlet RCA audio/video signal interface 230 is shown. Referring with particularity to FIGS. 6A and 6B, a three-outlet RCA audio/video plus S-video signal interface 330 is shown, where the RCA signal interfaces are shown as 330A and the S-video as 330B. Referring with particularity to FIGS. 7A and 7B, a four-outlet RCA signal interface 430 for component video and digital audio is shown. Referring with particularity to FIGS. 8A and 8B, a three-outlet RCA signal interface 530 used for composite video and stereo audio is shown. Referring with particularity to FIGS. 9A and 9B, a three-outlet RCA signal interface 630 for component video is shown. Referring with particularity to FIGS. 10A and 10B, a two-outlet RCA plus S-video is shown. As can be seen from the various types of outlets or jacks that the wall plate 1 can be equipped with, wall plate assemblies can be used for audio, visual, or other types of electrical signals, and can be extended to fiber optic and related transmission lines (such as HDMI/DVI Transition Minimized Differential Signaling (TMDS) Digital Video, ST, SC, FC, and LC) signal interfaces that either presently exist or would be created in the future.

Figure 3:
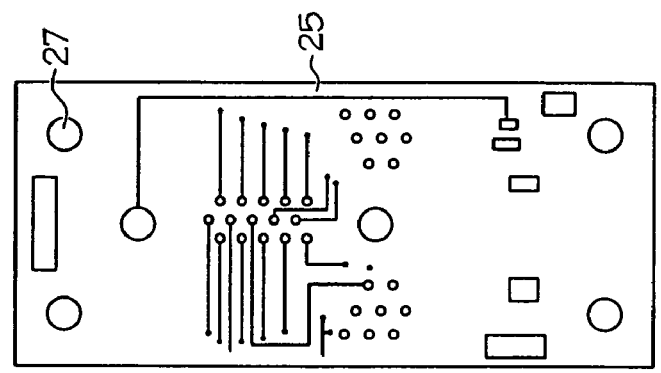
FIG. 3 illustrates a front view of a printed circuit board that is part of the assembly of FIG. 1.

Referring next to FIG. 3 in conjunction with FIG. 1, printed circuit board 20 is shown in more detail, where various leads (such as solder leads 45) can connect individual conductive lines within the cable lead 40, and are placed in accordance with the electrical needs of the signal. Printed circuit board 20 is of a generally planar construction and is fabricated by techniques well-known to those skilled in the art. Signal interface 30 is configured to mate with a corresponding member (not shown) that is wired to, or formed in, the printed circuit board 20. In one form, the circuit board 20 is substantially coextensive with the mounting frame 10 to better enable the signal interface 30 to line up with the appropriate wiring or circuitry on the circuit board 20. The circuit board 20 can be encased in a box 50 (an example which can be seen in FIGS. 1 and 2C) made from any suitable material. In one form, box 50 may be formed from a low-cost material, such as plastic, while in others, it may be shielded (i.e., made from a metal or other suitable shielding material) to reduce or eliminate the likelihood of radio frequency interference (RFI). The modular nature of the wall plate 1 and its assembly ensures functionality for numerous signal types, such as those discussed above in conjunction with the various signal interfaces.

Figure 11:
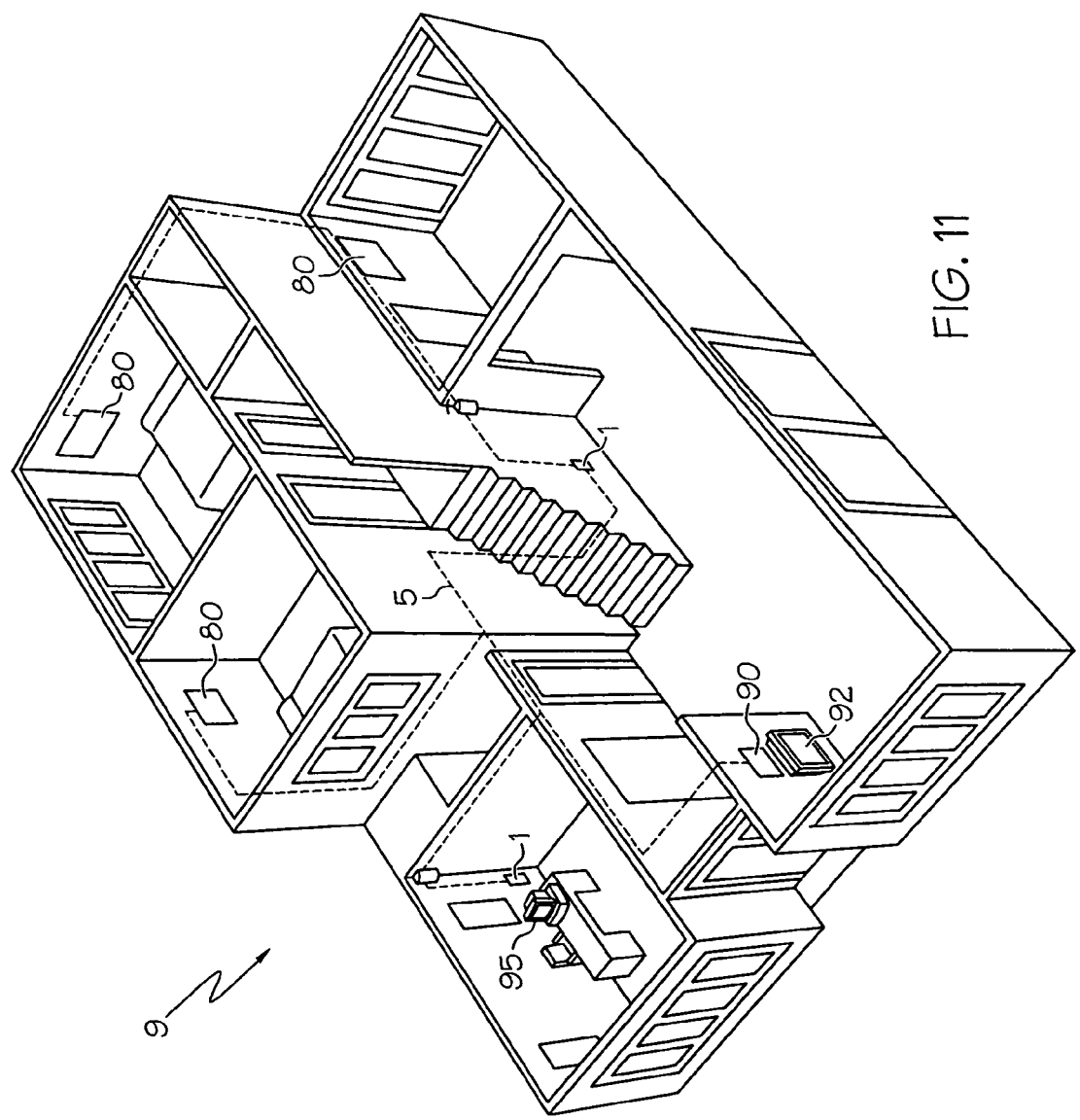
FIG. 11 shows a house using premise wiring and one embodiment of the wall plates of the present invention.

Referring next to FIG. 11, the placement of a premise siring system 5 in a dwelling 9 is shown. Wiring system 5 can be responsive to input from an electrical device, such as a central control panel 90 (may be connected to a multimedia system 92 or the like) or computer 95. As shown, wall plates 1 can form either a terminus point or an intermediary point within wiring system 5, and can be equipped with any of the signal interfaces described above. Monitors 80 can be placed in various locations within dwelling 9 to facilitate the transmission of audio/visual signals thereto.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A modular wall plate assembly mountable within a wall structure, said assembly comprising:
a mounting bracket defining a face thereon;
at least one signal interface extending outward from said face; and
a cable lead extending generally rearwardly from said mounting bracket, said cable lead comprising a plurality of conductive lines therein such that a proximal end of said plurality of conductive lines are in electrical communication with said at least one signal interface, and a distal end of said cable lead terminates in a modular quick-connect coupling to achieve tool-free electrical connection to a runner cable that is part of a premise wiring system such that upon modular electrical connection of said assembly to said runner cable, said at least one signal interface can carry an electronic signal to and from said runner cable, wherein the length of said cable lead is such that said quick-connect coupling defines a substantially farthest rearward projection of said assembly that is rearwardly cantilevered such that said quick-connect coupling comprises a termination with which to facilitate flexibly moveable connection to said runner cable once signal coupling is established therebetween.

2. The assembly of claim 1, further comprising a circuit board coupled to said mounting bracket to establish a permanent connection between said cable lead and said circuit board.

3. The assembly of claim 1, wherein said cable lead comprises a male distal end.

4. The assembly of claim 2, further comprising a housing coupled to said at least one of said circuit board and said mounting bracket.

5. The assembly of claim 4, wherein said housing comprises an electromagnetic shield configured to substantially enclose said circuit board.

6. The assembly of claim 1, wherein said at least one signal interface comprises a plurality of signal interfaces.

7. The assembly of claim 6, wherein said plurality of signal interfaces is selected from the group consisting of D-subminiature, BNC, RCA, 3.5 millimeter, S-video and combinations thereof.

8. The assembly of claim 1, further comprising a strain relief member disposed between said proximal end of said cable lead and said circuit board.

9. The assembly of claim 1, wherein said cable lead extends rearward such that said quick-connect coupling faces substantially away from said at least one signal interface.

10. The assembly of claim 1, wherein said circuit board is connected to said mounting bracket.

11. The assembly of claim 1, wherein the length of said cable lead is up to about eighteen inches.

12. The assembly of claim 11, wherein the length of said cable lead is up to about six inches.

13. A premise wiring system comprising:
a wall plate assembly comprising:
a modular wall plate mountable within a wall structure, said wall plate comprising:
a mounting bracket;
at least one signal interface extending outward from said mounting bracket; and
a cable lead extending generally rearwardly from said mounting bracket, said cable lead comprising a plurality of conductive lines therein such that a proximal end of said plurality of conductive lines are in electrical communication with said at least one signal interface, and a distal end of said cable lead terminates in a modular quick-connect coupling, wherein the length of said cable lead is such that said quick-connect coupling defines a substantially farthest rearward projection of said assembly; and
at least one runner cable comprising a plurality of conductive lines therein, said runner cable defining said signal source and comprising a quick-connect coupling on at least one end thereof such that upon engagement of said quick-connect coupling of said runner cable to said quick-connect coupling of said cable lead, a signal transmitted through said runner cable and said cable lead is also conveyed through said at least one signal interface, wherein said distal end of said cable lead is rearwardly cantilevered such that said quick-connect coupling comprises a flexible termination with which to facilitate moveable connection to said runner cable once signal coupling is established therebetween.

14. The premise wiring system of claim 13, further comprising a circuit board coupled to said mounting bracket, and a housing coupled to said at least one of said circuit board and said mounting bracket, said circuit board connected to said cable lead and said at least one signal interface to provide electrical communication therebetween.

15. The premise wiring system of claim 14, further comprising a gang box configured to substantially contain said wall plate assembly therein.

16. The premise wiring system of claim 13, wherein said at least one signal interface comprises a plurality of signal interfaces.

17. The premise wiring system of claim 16, wherein said plurality of signal interfaces is selected from the group consisting of D-subminiature, BNC, RCA, 3.5 millimeter, S-video and combinations thereof.

18. A method of connecting premise wiring to a wall plate assembly, said method comprising:
   arranging at least one runner cable in said premise wiring to include a quick-connect coupling at a terminus thereof; and
   connecting said quick-connect coupling to a complementary quick-connect coupling situated on said assembly, said assembly comprising:
      a mounting bracket defining a face thereon;
      at least one signal interface extending outward from said face; and
      a cable lead extending generally rearwardly from said mounting bracket, said cable lead comprising a plurality of conductive lines therein such that a proximal end of said plurality of conductive lines are electrically connected with said at least one signal interface, and a distal end of said cable lead terminates in a modular quick-connect coupling such that said runner cable and said assembly can be placed in electrical communication with one another without the need for a connecting tool, said distal end of said cable lead defining a cantilevered end such that said connecting defines a substantially non-rigid joining, thereby permitting a range of flexible movement between said quick-connect coupling and said complementary quick-connect coupling.

19. The method of claim 18, further comprising permanently connecting said proximal end of said cable lead to at least one of a circuit board and said signal interface.

20. The method of claim 19, further comprising reducing tension between said wall plate assembly and said at least one cable in said premise wiring.

21. The method of claim 20, wherein said reducing tension comprises placing a strain relief device between said at least one cable in said premise wiring and said signal interface.

* * * * *

UNITED STATES PATENT AND TRADEMARK OFFICE
CERTIFICATE OF CORRECTION

PATENT NO.        : 7,563,131 B2
APPLICATION NO.   : 11/482191
DATED             : July 21, 2009
INVENTOR(S)       : Thomas Sullivan and Gary Hess Page 1 of 1

It is certified that error appears in the above-identified patent and that said Letters Patent is hereby corrected as shown below:

Col. 5, line 28, "premise siring", should read --premise wiring--

Col. 6, line 8, "claim 1", should read --claim 2--

Col. 6, line 16, "claim 1", should read --claim 2--

Col. 6, line 22, "claim 1", should read --claim 2--

Col. 6, line 25, "claim 1", should read --claim 2--

Col. 6, line 28, "claim 1", should read --claim 2--

Col. 6, line 30, "claim 1", should read --claim 2--

Col. 6, line 54, "defining said signal", should read --defining a signal--

Signed and Sealed this

First Day of December, 2009

David J. Kappos
*Director of the United States Patent and Trademark Office*